UNITED STATES PATENT OFFICE.

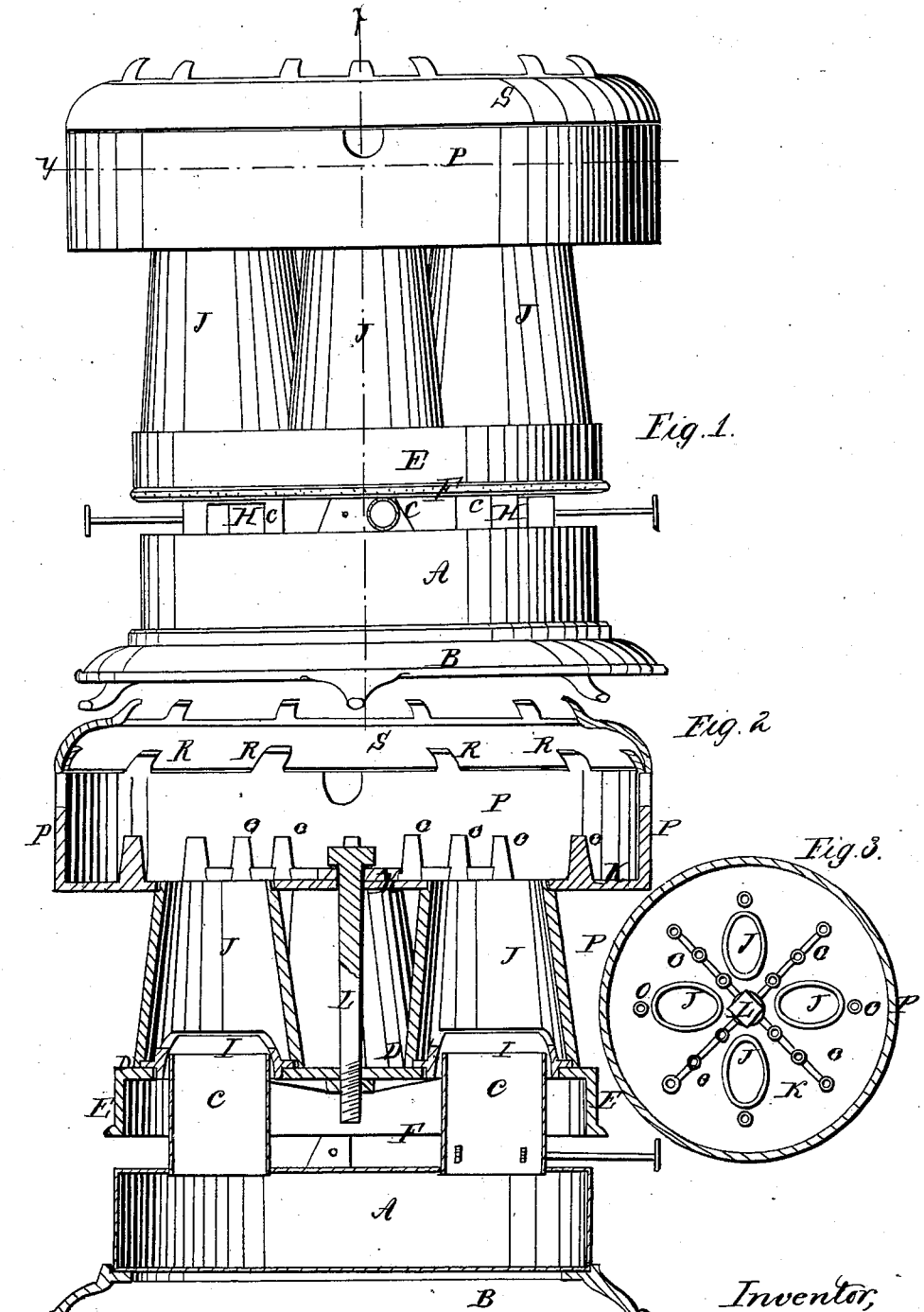

ROBERT B. MITCHELL, OF CHICAGO, ILLINOIS.

KEROSENE-STOVE.

Specification forming part of Letters Patent No. 96,249, dated October 26, 1869.

*To all whom it may concern:*

Be it known that I, ROBERT B. MITCHELL, of Chicago, in the county of Cook and State of Illinois, have invented a new and useful Improvement in Kerosene-Stoves; and I do hereby declare the following to be a full, clear, and exact description of the same, reference being had to the accompanying drawing, and the letters and figures marked thereon, which form a part of this specification, and in which—

Figure 1 represents a side elevation of my improved stove; Fig. 2, a vertical sectional view at the line $x$; and Fig. 3, a transverse sectional view at the line $y$, it being made upon a smaller scale than the other views.

The nature of my invention consists in the combination of the chimney and the plates in a kerosene-stove, as hereafter more fully described.

It further consists in the projectures or points on the surface of the plate on the top of the chimney, so arranged as to admit cooking-furniture being placed upon them, but not upon the top of the chimney; and it also further consists of the combination of the rings that hold the cooking-furniture on the top of the stove, as hereafter more fully specified.

To enable those skilled in the art to understand how to manufacture and use my invention, I will proceed to describe the same with particularity.

The same letters of reference refer to the corresponding parts in the different figures.

In the annexed drawings I have represented the kerosene-oil pot A resting in a cast-iron bottom, B, and C are the ordinary wick-tubes.

There is a plate, D, cast with openings or holes for the wick-tube and cone of the burner, and it has a rim or flange, E, which extends down from its circumference nearly or quite half the length of the wick-tube, and there is a perforated diaphragm, F, attached to the lower edge of this flange, through which the air passes to reach the burner. There are holes in this perforated diaphragm, through which the wick-tubes pass, and there is an air-space between the diaphragm and the plate D.

The rim or flange E is of thick heavy metal, upon bearings H, and supports the stove above, said bearings resting on the oil-pot A.

I are the cones, and they have flanges near their bases, as shown, to hold them in position on the plate D.

The chimneys J are placed over the cones I, resting on the plate D, and when they are made separate from the cones there is a recess or notch in the bottom of the cone, as shown, for the flange of the cone, so that the chimney rests partly on the flange, and holds the cone in place.

The cone and chimney may be cast together, there then simply being a flange on the bottom of the cone, to pass through the plate D around the burner C.

There rests on the top of the chimneys a plate, K, there being holes in said plate for the tops of the chimneys, as shown, and notches in the tops of the chimneys to receive the plate, to prevent it from sliding laterally.

The plates K and D are firmly bolted together by the screw-bolt L, the chimneys and cones being securely fastened between them, as shown.

There are projections or ribs, O, on the upper surface of the plate K, for the purpose of preventing the placing of any cooking utensil directly on the top of the chimneys, thereby stopping the draft, and at the same time said projections are sufficiently high, and so arranged that by placing a cooking utensil upon them it is placed so near the heat passing through the chimneys that it is quickly heated without interrupting the draft of the chimneys.

The plate K has also a vertical rim or flange, P, with projections R upon its upper edge, to receive the cooking utensil. These projections are to secure a freedom of draft through the chimneys by securing an open space beneath the cooking utensil placed upon the stove to be heated.

It is frequently desirable to use, in cooking, utensils of different sizes. As most articles of stove-furniture are made either nine or seven inches in diameter, I usually make the projections R on the top of the flange P, so as to receive nine-inch furniture, and I also make an addition ring or rim, S, which fits upon the top of the ring or flange P, and has its top drawn in, making a smaller circumference, so that its projections T upon its upper edge receive smaller cooking utensils, ordinarily seven-inch utensils. This ring S can be readily removed and replaced, as desired, as it simply rests upon the ring P.

I am aware that kerosene cooking-stoves have been made which, instead of the chimneys that I use, employ a single cylinder to make the draft for all the burners, in which stoves, the draft being imperfect, the burners are very liable to smoke, and the heat is not as great in proportion to the oil consumed.

Having fully explained the construction and operation of my improved kerosene-stove, what I claim, and desire to secure by Letters Patent, is—

1. The combination of the chimneys J and plates D and K, when constructed and arranged in a kerosene-stove substantially as and for the purposes specified and shown.

2. The projections or ribs O on the upper surface of the plate K, in combination with the chimneys J in a kerosene-stove, when constructed and arranged substantially as and for the purposes described.

3. The ring S, in combination with the rim or ring P, when constructed and operating substantially as and for the purposes set forth.

4. The combination of the plate D, flange E, and perforated plate or diaphragm F, when constructed and arranged substantially as and for the purposes specified and shown.

ROBERT B. MITCHELL.

Witnesses:
LEWIS L. COBURN,
H. BRUNS.